(12) United States Patent
Sheffield et al.

(10) Patent No.: US 10,122,997 B1
(45) Date of Patent: Nov. 6, 2018

(54) AUTOMATED MATRIX PHOTO FRAMING USING RANGE CAMERA INPUT

(71) Applicant: Lowe's Companies, Inc., Mooresville, NC (US)

(72) Inventors: Mason E. Sheffield, Woodinville, WA (US); Oleg Alexander, Kirkland, WA (US)

(73) Assignee: LOWE'S COMPANIES, INC., Mooresville, NC (US)

( * ) Notice: Subject to any disclaimer, the term of this patent is extended or adjusted under 35 U.S.C. 154(b) by 0 days.

(21) Appl. No.: 15/586,207

(22) Filed: May 3, 2017

(51) Int. Cl.
| | |
|---|---|
| *H04N 13/282* | (2018.01) |
| *H04N 13/02* | (2006.01) |
| *H04N 13/296* | (2018.01) |
| *G06T 17/10* | (2006.01) |

(52) U.S. Cl.
CPC ....... *H04N 13/282* (2018.05); *H04N 13/0282* (2013.01); *H04N 13/0296* (2013.01); *H04N 13/296* (2018.05); *G06T 17/10* (2013.01)

(58) Field of Classification Search
CPC ............ H04N 13/0282; H04N 13/0296; G06T 2207/10028; G06T 17/10; G06Q 10/087; G06Q 30/0605; G06Q 30/0631
See application file for complete search history.

(56) References Cited

U.S. PATENT DOCUMENTS

| | | |
|---|---|---|
| 5,251,156 A | 10/1993 | Heier et al. |
| 6,175,647 B1 | 1/2001 | Schick et al. |
| 6,611,617 B1 | 8/2003 | Crampton |
| 6,858,826 B2 | 2/2005 | Mueller |
| 6,983,064 B2 | 1/2006 | Song |
| 7,768,656 B2 | 8/2010 | Lapa et al. |
| RE43,895 E | 1/2013 | Crampton |
| 8,848,201 B1 * | 9/2014 | Bruce .................... G01B 11/24 356/601 |
| 9,307,231 B2 | 4/2016 | Mallet et al. |
| 9,307,232 B1 | 4/2016 | Warner |
| 9,324,179 B2 | 4/2016 | Wooley et al. |
| 2003/0030636 A1 | 2/2003 | Yamaoka |
| 2007/0035539 A1 | 2/2007 | Matsumura et al. |

(Continued)

FOREIGN PATENT DOCUMENTS

| | | |
|---|---|---|
| DE | 102010010296 A1 | 9/2011 |
| JP | 3609669 B2 | 10/2004 |

(Continued)

*Primary Examiner* — Dave Czekaj
*Assistant Examiner* — Berteau Joisil
(74) *Attorney, Agent, or Firm* — Kilpatrick Townsend & Stockton LLP

(57) ABSTRACT

Described herein are a system and methods for generating 3D models using imaging data obtained from an array of camera devices. In embodiments, the system may determine a depth or range between an object and the array of camera device. Based on this depth information, the system may automatically identify appropriate framing information for that array of camera devices based on operational constraints. One or more properties of the camera devices in the array of camera devices may then be adjusted in order to obtain image information in accordance with the identified framing information. The object may then be rotated in accordance with the operational constraints and the process may be repeated until a full set of images has been obtained.

20 Claims, 9 Drawing Sheets

(56) References Cited

U.S. PATENT DOCUMENTS

| | | |
|---|---|---|
| 2009/0067706 A1* | 3/2009 | Lapa .................. G01B 11/245 382/154 |
| 2013/0004060 A1 | 1/2013 | Bell et al. |
| 2014/0043436 A1 | 2/2014 | Bell et al. |
| 2015/0043225 A1 | 2/2015 | Goodman et al. |
| 2015/0138320 A1 | 5/2015 | El Daher |
| 2015/0269785 A1 | 9/2015 | Bell et al. |
| 2015/0288951 A1 | 10/2015 | Mallet et al. |
| 2016/0055268 A1 | 2/2016 | Bell et al. |
| 2016/0217225 A1 | 7/2016 | Bell et al. |

FOREIGN PATENT DOCUMENTS

| | | |
|---|---|---|
| JP | 2006098065 A | 4/2006 |
| JP | 4700739 B2 | 6/2011 |
| KR | 1016500110000 B1 | 8/2016 |
| WO | 0223918 A2 | 3/2002 |
| WO | 2014-074003 A1 | 5/2014 |

\* cited by examiner

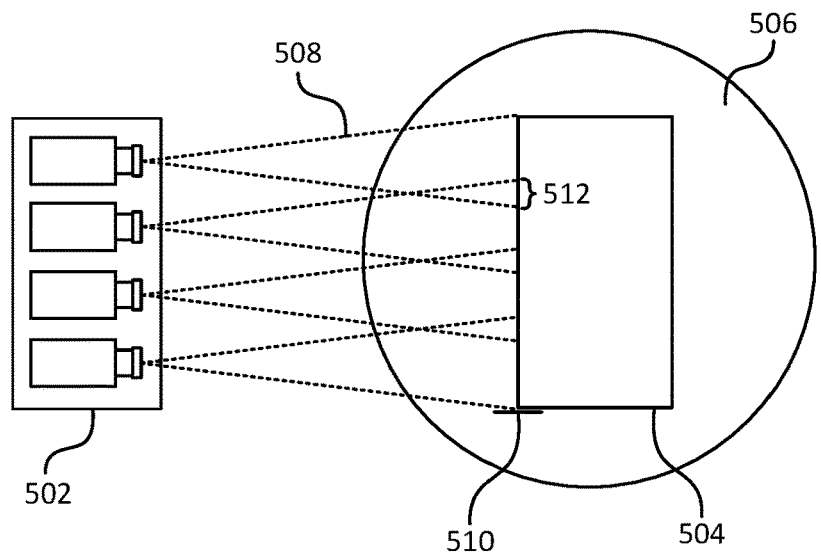
FIG. 5A
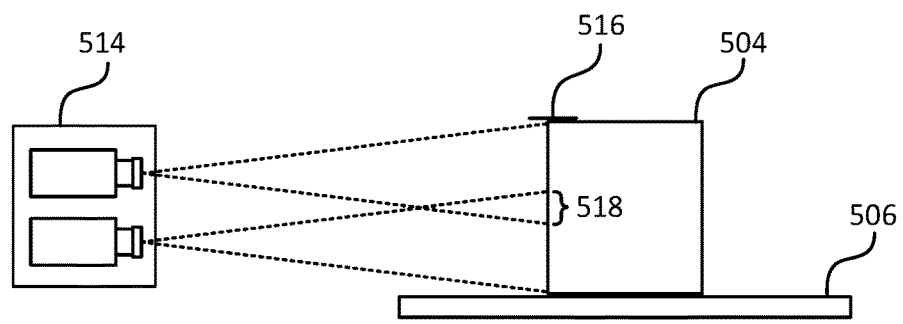
FIG. 5B
*FIG. 5*

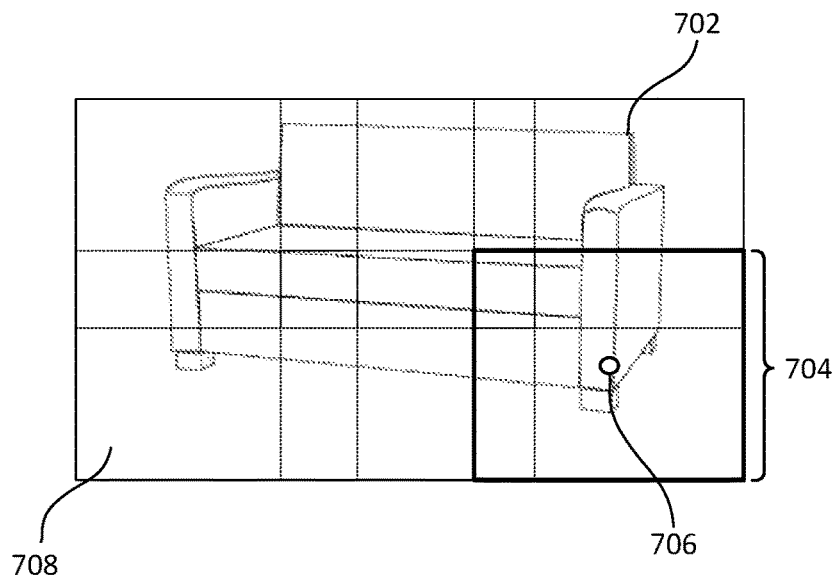
FIG. 7A
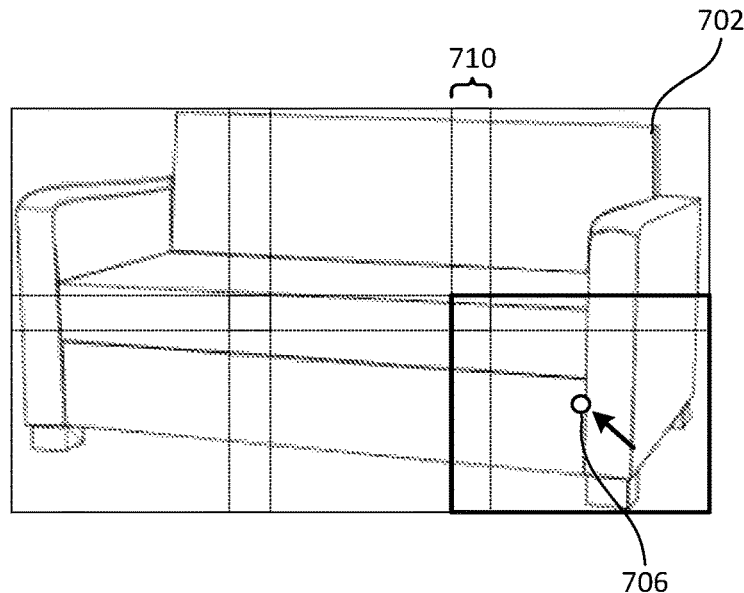
FIG. 7B
*FIG. 7*

AUTOMATED MATRIX PHOTO FRAMING USING RANGE CAMERA INPUT

BACKGROUND

In a number of industries, three-dimensional (3D) models may be used to represent various objects. For example, any industry that uses or sells objects may need to understand how different objects interact or how they might appear together. The generation of such a 3D model may require that a system obtain an image of the surface of an object, which may be rendered or displayed as a two-dimensional image via 3D rendering or displayed as a three-dimensional image.

Various techniques exist for generating 3D models from objects. For example, a given object may be scanned from a number of different angles, and the scanned images can then be combined to generate the 3D image of the object. In some embodiments, the scanned image information may include a matrix of images taken from each angle, which may be obtained from an array of cameras.

Although 3D models may be solid models that define a volume of the object, they more likely include a shell or boundary that represent a surface of the object, with the image obtained for an angle mapped to that surface. These types of boundary representation 3D models are commonly used in industries that use 3D models.

SUMMARY

In some embodiments, techniques described herein are directed to methods of automating the generation of 3D models given operational constraints. The system described herein may employ an array of cameras configured to obtain a matrix of images from a number of angles. In some embodiments, the system may be configured to receive one or more operational characteristics from a user. In some embodiments, the system may use depth information to determine a number of fields of views for each of the cameras in the array of cameras.

In some embodiments, the disclosure may be directed to a method of generating a 3D model by an array of cameras, comprising receiving one or more operational constraints from a user in relation to a 3D model, identifying boundary information associated with an object in relation to the 3D model, determining, based on the boundary information, a number of boundaries for an array of images to be associated with the array of cameras in accordance with the operational constraints, causing a property of individual cameras in the array of cameras to be updated based on the determined number of images, and causing the array of cameras to capture the array of images.

In some embodiments, the disclosure may be directed to a 3D imaging system comprising an input sensor, one or more camera devices, a processor, and a memory including instructions that, when executed with the processor, cause the system to receive information from a user regarding one or more operational constraints, obtain input from the input sensor indicating depth information associated with an item, determine at least one boundary for the item, adjust an optical property of the one or more camera devices such that an image captured by the one or more camera devices is bounded by the at least one boundary for the item in accordance with the one or more operational constraints, and capture, using the one or more camera devices, image information using the adjusted optical property.

In some embodiments, the disclosure may be directed to a 3D imaging apparatus comprising an array of cameras configured to capture an array of images of an object, and a control unit communicatively coupled to the array of cameras, the control unit configured to: receive, via an interface, one or more operational constraints of the 3D imaging apparatus, identify a boundary of the object, determine a number of image boundaries from the identified boundary of the object based on the one or more operational constraints, and provide instructions to the array of cameras to cause it to capture an array of images with the number of image boundaries.

BRIEF DESCRIPTION OF THE DRAWINGS

Various embodiments in accordance with the present disclosure will be described with reference to the drawings, in which:

FIG. 5A depicts a top-down view of a 3D imaging apparatus configured to capture image information for an object in accordance with embodiments of the disclosure;

FIG. 5B depicts a side view of a 3D imaging apparatus configured to capture image information for an object in accordance with embodiments of the disclosure;

FIG. 7A depicts an image that may be captured by a 3D imaging system prior to a matrix framing procedure;

FIG. 7B depicts an image that may be captured by the 3D imaging system subsequent to a matrix framing procedure;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to a three-dimensional (3D) imaging system configured to generate a 3D model from an object using automatic framing to capture a matrix of images from an array of cameras. The imaging system may be provided with a number of operational constraints associated with the generation of a 3D model. In some embodiments, depth information may be obtained with respect to an object for which a 3D model is to be generated. In some embodiments, appropriate framing information may be determined using the depth information. Once appropriate framing information has been determined, the array of cameras may be updated to obtain images in accordance with the framing information. The object may then be repositioned and this process may be repeated until a full set of images is obtained. It should be noted that though the images may be captured as a matrix of images, the array of cameras may not be arranged in a matrix. For example, the cameras in the array of cameras may be arranged in a row, each having a pan, tilt, and level of zoom that cause the array of cameras to capture the images as a matrix.

By way of illustration, a user may provide one or more operational constraints to a 3D imaging system to initiate generation of a 3D model. In this illustration, the operational constraints provided by the user may include an overlap value and a number of sets of images to be taken. Once received, the imaging system may determine depth information for an object with respect to the object's position in relation to an array of cameras. The system may then use that depth information to determine how each of the cameras in the array of cameras should be adjusted (e.g., where each camera should be aimed and how much a lens for that camera should be zoomed in) for each image in an array of images to be captured. Once this has been done, a set of images may be captured as an array of images. The object may then be rotated to expose a different view of the object. This process may be repeated until a full set of images has been obtained.

Figure 1:
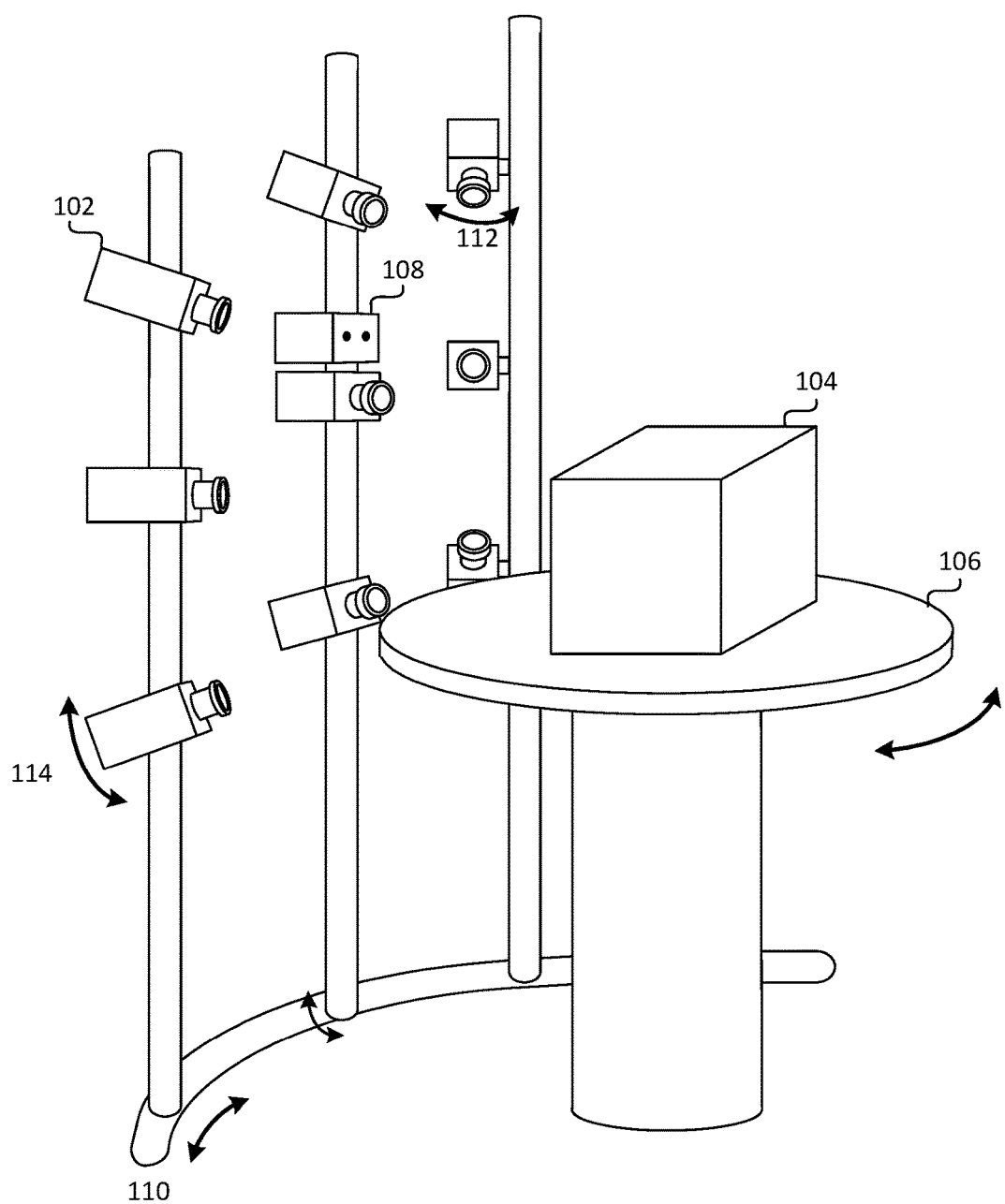
FIG. 1 depicts an illustrative example of a 3D imaging system that may be implemented in accordance with embodiments of the disclosure.

FIG. 1 depicts an illustrative example of a 3D imaging system that may be implemented in accordance with embodiments of the disclosure. In FIG. 1, an array of cameras 102 may be positioned in an array or matrix (e.g., in rows and/or columns) and may be configured to obtain a set of images of an object 104 positioned on a staging platform 106. In some embodiments, the 3D imaging system may also include a depth sensor 108 configured to obtain depth information associated with the object 104 placed on the staging platform 106.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

The one or more cameras 102, arranged in the array, may be configured to capture a corresponding array of images. For example, each of the cameras 102 may each be configured to capture an image of a different section of a surface of the object. In some embodiments, the images in an array of images may overlap. For example, adjacent images in the array of images may share a number of pixels or some other proportion of the image. In some cases, the overlap in the images may be used to align different images within a matrix of images (e.g., to place the image in space). For example, the system, when generating a 3D model, may align various images within the matrix of images by identifying common features within the image information. As can be envisioned, when capturing images of items, the amount of overlap needed to effectively generate a 3D model may be dependent upon a uniformity or lack of detail in the surface of the item to be imaged. For example, generating 3D models of items that have very uniform surfaces and little detail may require a greater amount of overlap in the images used to generate the models. In another example, if an item to be scanned has many surface details, the overlap of the images may be reduced in order for the item to be photographed and the 3D model generated more quickly. This is made possible because the many surface details can be more easily matched within adjacent images so less overlap is necessary to align the images. For these reasons, a user may wish to elect a particular level of overlap for each item for which images are to be captured based on an amount of surface detail for that item. In some embodiments, the system may be configured to identify an appropriate level of overlap for the images to be captured automatically (e.g., without user input) based on the number of surface details for that item. For example, the system may use a camera to capture an initial image (e.g., a low resolution image) of the item and may use one or more machine vision techniques to identify an appropriate level of overlap to be applied to the images captured by the system.

In some embodiments, the object 104 may be placed on a staging platform, such as the stage platform 106. The staging platform 106 may be capable of being rotated or otherwise moved. For example, the staging platform 106 may be fitted with a motor or other actuator to be used in angular rotation of the platform. The staging platform 106 may be further configured to be rotated a set number of degrees based on the provided operational constraints. For example, during the course of obtaining a set of images, a control unit (not shown) may cause the staging platform 106 to reposition the object a number of times so that sets of images may be taken of the object 104 at each position.

In some embodiments, the 3D imaging system may include one or more depth sensors 108 configured to capture depth information related to the object on the staging platform 106. A depth sensor may include any device configured to obtain information related to a range or distance between the object 104 and the array of cameras. The depth sensor may be configured to generate a range image or depth map based on received depth information.

In some embodiments, the cameras of the array of cameras may be configured to be rotated or moved. For example, the cameras may be positioned on moveable tracks or rails 110 in order to cause a camera, a row of cameras, and/or a column of cameras to be repositioned in accordance with instructions provided by a control unit. In some embodiments, one or more cameras may be installed on a mechanical arm assembly. In some embodiments, each of the cameras 102 in the array of cameras may be configured such that a level of pan (e.g., 112) or tilt (e.g., 114) for that camera may be adjusted.

Figure 2:
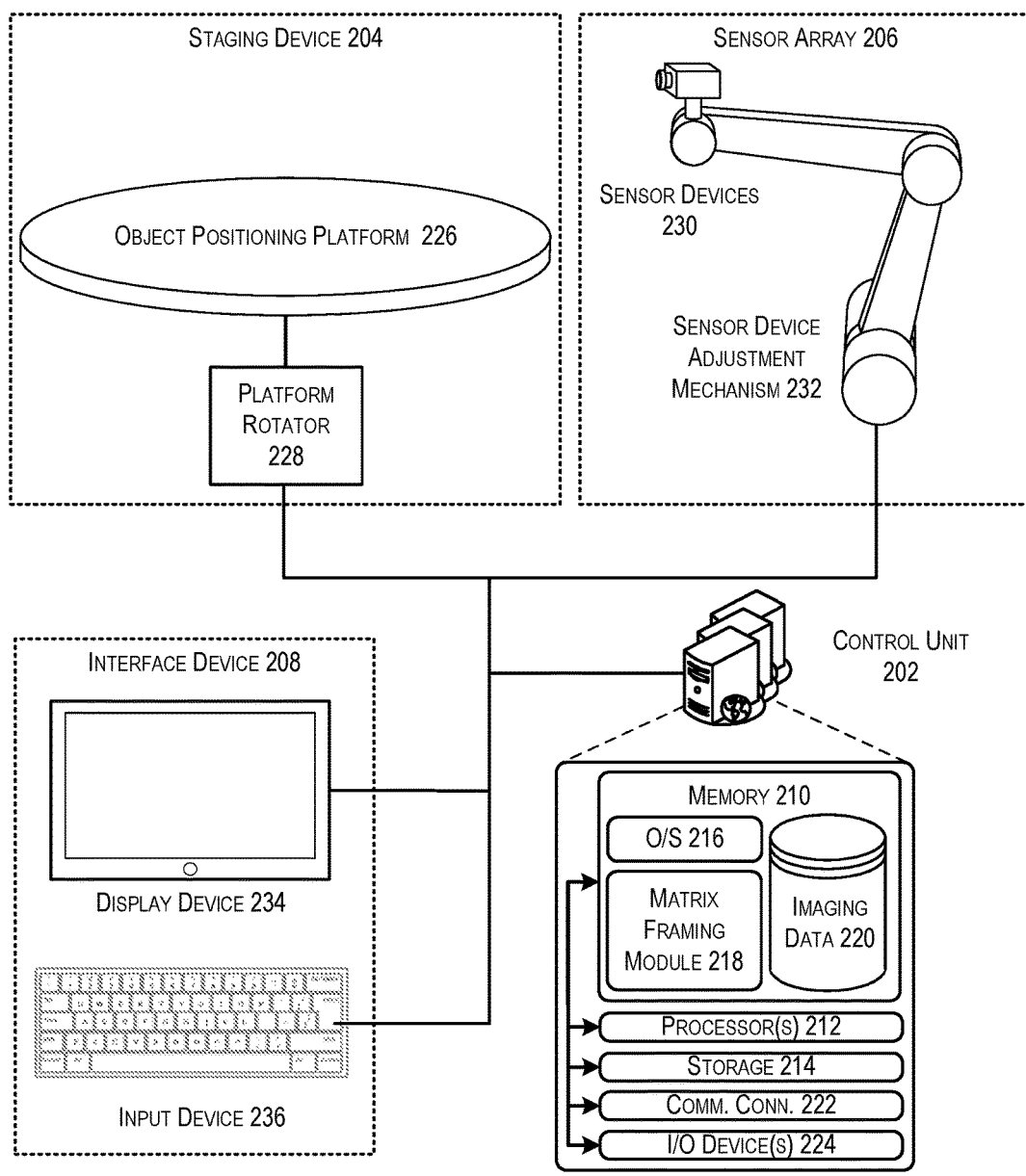
FIG. 2 depicts a system architecture for a 3D imaging system that utilizes automated matrix framing based on range camera information.

FIG. 2 depicts a system architecture for a 3D imaging system that utilizes automated matrix framing based on range camera information. In FIG. 2, a control unit may be in communication with a number of other components, including at least a staging device 204, a sensor array 206, and an interface device 208.

The control unit 202 may be any type of computing device configured to capture 3D images from an object. In some embodiments, the control unit 202 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the control unit 202 may include at least one memory 210 and one or more processing units (or processor(s)) 212. The processor(s) 212 may be implemented as appropriate in hardware, computer-executable instructions, firmware or combinations thereof. Computer-executable instruction or firmware implementations of the processor(s) 212 may include computer-executable or machine executable instructions written in any suitable programming language to perform the various functions described.

The memory 210 may store program instructions that are loadable and executable on the processor(s) 212, as well as data generated during the execution of these programs. Depending on the configuration and type of control unit 202, the memory 210 may be volatile (such as random access memory (RAM)) and/or non-volatile (such as read-only memory (ROM), flash memory, etc.). The control unit 202 may also include additional storage 214, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 210 may include multiple different types of memory, such as static random access memory (SRAM), dynamic random access memory (DRAM) or ROM. Turning to the contents of the memory 210 in more detail, the memory 210 may include an operating system 216 and one or more application programs or services for implementing the features disclosed herein including at least a module for managing automated framing of imaging devices (matrix framing module 218). The memory 210 may also include imaging data 220, which provides information associated with the 3D imaging system. In some embodiments, the imaging data 220 may be stored in a database.

The memory 210 and the additional storage 214, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the control unit 202. The control unit 202 may also contain communications connection(s) 222 that allow the control unit 202 to communicate with a stored database, another computing device or server, user terminals, and/or other components of the imaging system. The control unit 202 may also include input/output (I/O) device(s) and/or ports 224, such as for enabling connection with a keyboard, a mouse, a pen, a voice input device, a touch input device, a display, speakers, a printer, etc.

Turning to the contents of the memory 210 in more detail, the memory 210 may include an operating system 216, a database containing imaging data 220 and the one or more application programs or services for implementing the features disclosed herein, including a matrix framing module 218.

In some embodiments, the matrix framing module 218 may be configured to, in conjunction with the processors 212, identify an appropriate frame for one or more camera devices (e.g., the cameras 102) and automatically adjust optical properties of the one or more camera devices in accordance with the appropriate frame. In accordance with at least some embodiments, the matrix framing module 218 may receive depth information (e.g., a range image) from a depth sensor (e.g., a range camera), such as the depth sensors 108 previously described. Based on this information, the matrix framing module 218 may determine the bounds of an object (e.g., the object 104) to be imaged. For example, a sudden variance in depth within the depth information may indicate a border or outline of the object. In some embodiments, the matrix framing module 218 may utilize one or more machine vision techniques to identify the bounds of an object. Once the bounds of an object have been identified, the matrix framing module 218 may calculate an appropriate pan, tilt, and level of magnification (zoom) to be applied to each sensor in the sensor array 206. The matrix framing module 218 may then provide instructions to one or more actuators (e.g., those of a sensor device adjustment mechanism 232 or a platform rotator 228) to cause the sensor devices to be positioned in accordance with the determined appropriate pan and tilt. Once this has been accomplished, the control unit may cause the sensor array 206 to capture an image (or array of images) of the object.

In some embodiments, a staging device 204 may be any device or structure configured to manipulate a position of an item for the purpose of obtaining image information. Staging platform 106 described in FIG. 1 may be an example staging device 204. In some embodiments, the staging device 204 may include an object positioning platform 226 and a platform rotator 228. The object positioning platform 226 may be a rotatable platform upon which one or more items can be placed for imaging of the items using the sensor array 206. In some embodiments, the rotatable platform may be configured to be rotated by the platform rotator 228 in order to reposition the item on the platform. The platform rotator 228 may be a motor configured to, upon receiving instructions from the control unit 202, activate and cause the object positioning platform to rotate.

In some embodiments, the sensor array 206 may include a number of sensor devices 230 and one or more sensor device adjustment mechanisms 232. The sensor devices 230 may include a number of camera devices, one or more of which may be a range camera device (e.g., a depth sensor) capable of generating a range image, and a number of which may be cameras configured to capture image information. The cameras 102 and depth sensor 108 depicted in FIG. 1 is an example of a sensor array 206 that may be implemented. In some embodiments, the sensor array 206 may include a number of camera devices arranged in an array or matrix (e.g., in rows and columns). Each of the camera devices in the array of camera devices may be positioned (e.g., having a tilt and position) to capture image information with respect to a particular respective field of view. In some embodiments, each of the camera devices may be configured to be repositioned in order to alter that camera device's tilt, pan, and/or level of magnification to capture an image of a specified field of view.

The sensor device adjustment mechanism 232 may be any mechanism having means for adjusting a pan, tilt, and/or position of one or more sensor devices. In some embodiments, the sensor device adjustment mechanism 232 may be a mechanical or robotic arm. In some embodiments, the one or more sensor devices may be arranged on a track or rail, in which case the sensor device adjustment mechanism 232 may include a means for moving the sensor device along the track or rail. In some embodiments, the one or more sensor devices may be arranged on a tripod or pole, in which case the sensor device adjustment mechanism 232 may include a means for providing angular rotation for the sensor devices. One skilled in the art, after considering the teachings of this disclosure, would easily recognize a number of sensor device adjustment mechanisms that may be employed with the disclosed system.

For the purposes of this disclosure, a range camera (e.g., a depth sensor) may be any device configured to identify a distance or range of an object or objects. In some embodiments, the range camera may generate a range image, in which pixel values correspond to the detected distance for that pixel. The pixel values can be obtained directly in physical units (e.g., meters). In at least some embodiments of the disclosure, the 3D imaging system may employ a range camera that operates using structured light. In a range camera that operates using structured light, a projector projects light onto an object or objects in a structured pattern. The light may be of a range that is outside of the visible range (e.g., infrared or ultraviolet). The range camera may be equipped with one or more camera devices configured to obtain an image of the object with the reflected pattern. Distance information may then be generated based on distortions in the detected pattern. It should be noted that although this disclosure focuses on the use of a range camera using structured light, any suitable type of range camera, including those that operate using stereo triangulation, sheet of light triangulation, time-of-flight, interferometry, coded aperture, or any other suitable technique for range detection, would be useable by the described system.

In some embodiments, the 3D imaging system may include an interface device 208. An interface device may include any combination of display device 234 and/or input device 236. In some embodiments, each of the display device 234 and the input device 236 may be separate devices which are communicatively coupled. The display device may include any means for presenting information to a user or users. In some embodiments, the display device may include outputs for audio presentation of data. In some embodiments, the display device may be wearable. For example, the display device 234 may be a virtual reality (VR) or augmented reality (AR) headset.

The input devices 236 may be any device configured to receive input from a user and convert that input into machine executable instructions. In some embodiments, the input devices 236 may include mouse, keyboards, joysticks, or any other suitable means of receiving user input. In some embodiments, the interface device 208 may be used, in conjunction with the control unit 202, to manipulate the sensor array 206 and/or components of the staging device 204. In some embodiments, the user may provide an indication of one or more desired operational characteristics and the control unit may, using the matrix framing module 218, automatically adjust the sensor array 206 and/or components of the staging device 204 in accordance with the desired operational characteristics.

Figure 3:
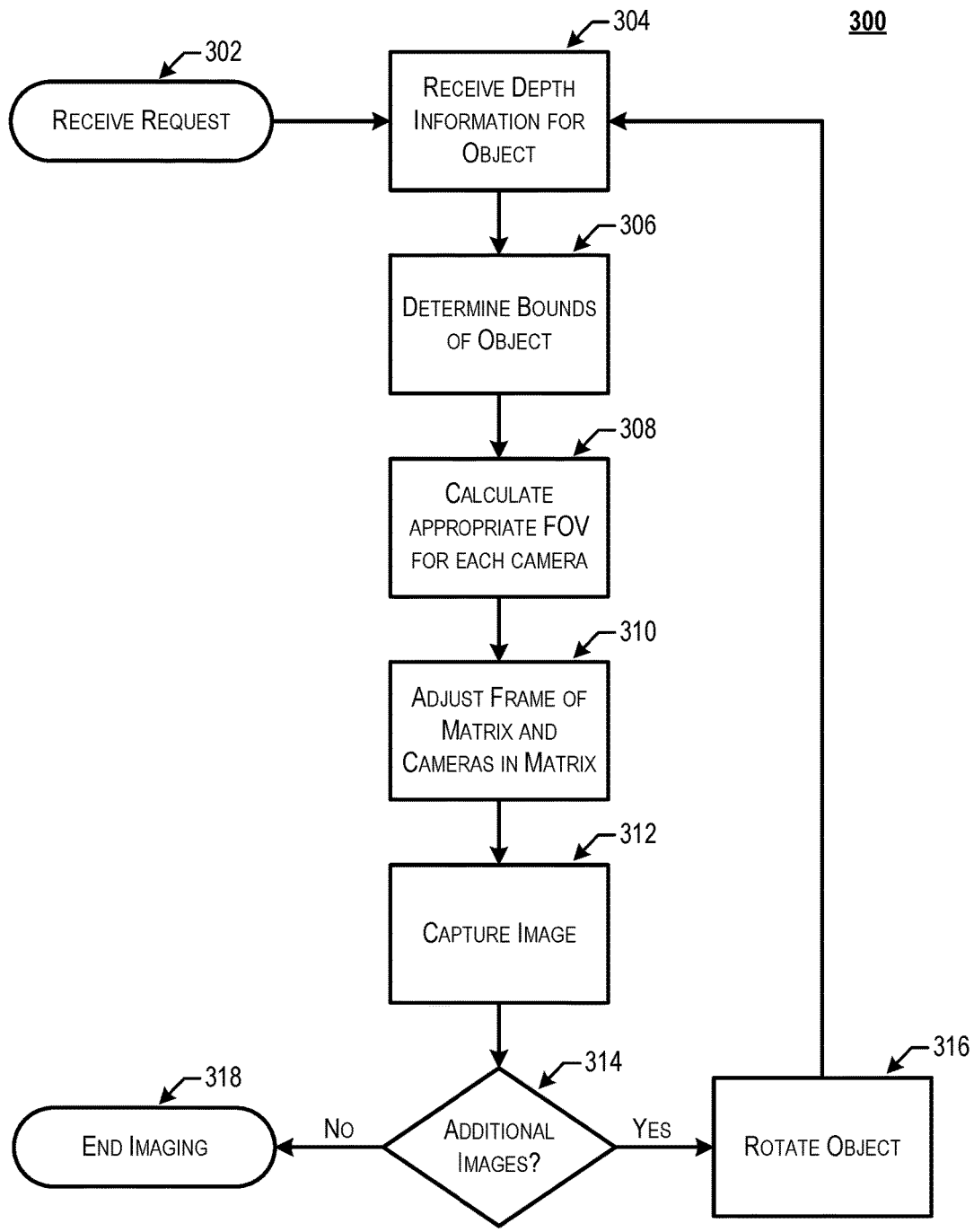
FIG. 3 depicts a flow chart illustrating a process for generating a 3D model using automated matrix framing in accordance with at least some embodiments.

FIG. 3 depicts a flow chart illustrating a process for generating a 3D model using automated matrix framing in accordance with at least some embodiments. Some or all of the process 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Process 300 may be performed by an example sensor array 206, a control unit 202, and various other components, each of which is depicted with respect to FIG. 2.

Process 300 may begin at 302, when a request is received by a control unit 202 to generate a 3D image of an object. In some embodiments, the object may be positioned within a staging area (e.g., on an object positioning platform) in view of an array of camera devices. In some embodiments, a user may submit a request to the 3D imaging system via an interface device 208 to capture a 3D image of an object that includes a number of operational characteristics to which the image must conform. For example, if the 3D imaging system includes an array or matrix of cameras, the request may include information on an overlap, or a portion of a field of view that should be captured by two adjacent camera devices. In another example, the operational constraints may include an indication of a number of columns and/or a number of rows to be included in a matrix of images. In yet another example, the user may specify an amount of whitespace (e.g., a margin) that should surround the object in the image.

There may be a number of reasons for selecting a particular operational constraint. For example, because overlap between adjacent images is used by the system to find an image's location in space with respect to a matrix of images, and because that location in space is determined based on object details, an amount of overlap needed will vary based on a level of detail of the object being imaged. In this example, a user may select a greater level of overlap when generating a 3D model representation of an object having little surface detail (as it may be more difficult to align images captured of that object). In this same example, a user may select a lower level of overlap when generating a 3D model representation of an object having a lot of surface detail. By way of a second example, a user may select a number of images to be included in a matrix of images (e.g., a number of rows and/or columns) based on a level of detail that the user wishes to achieve for the generated 3D model representation. As can be envisioned, using a larger number of images in the matrix of images will result in achieving a greater level of detail as each camera field of view is more focused. However, using a larger number of images in the matrix of images will also take up more memory. Accordingly, a user may wish to configure various operational constraints based on whether greater detail is needed.

At 304, the system may receive depth information from a depth sensor. For example, the depth sensor may, in response to receiving instructions from the system, activate and obtain image information that may be used to determine depth information. The depth sensor may then be configured to calculate one or more depths associated with various locations within the image information. For example, the depth sensor may include a projector device configured to project structured light onto the object. In this example, the depth sensor may capture an image of the reflected projected light and may determine depth information based on detected distortions in the structure of the reflected light. In some embodiments, the depth information provided to the system by the depth sensor may take the form of a range image, or depth map.

At 306, the control unit 202 may identify the bounds of the object for which the image is to be captured. In some embodiments, this may involve the use of the received depth information. In some embodiments, this may be done by detecting a large variance in depth information over a given distance. For example, if the depth information indicates that a depth within a depth map changes from 1 meter to 6 meters within a few pixels, then the system may determine that at least one of those few pixels represents a boundary of the object.

The control unit 202 may also use machine vision to identify the bounds of the object. In some embodiments, the staging area in which the object is located may be marked with one or more identifiers or patterns that may be used, when captured within image information, to determine the bounds of the object. For example, the system may attempt to locate the pattern within an initial image of the object and, upon detecting the pattern, may determine that the bounds of the object coincide with the edges of the detected pattern.

At 308, the control unit 202 may calculate an appropriate field of view for each camera in an array of cameras. In some embodiments, this may involve determining a total field of view for the array of cameras based on the bounds of the object. In some embodiments, the system may determine each of the bounds of the field of view for the array of cameras as coinciding with the determined bounds of the object. In this way, the system may minimize the amount of whitespace captured in images taken by the cameras. Upon determining an appropriate amount of overlap for each of the images (e.g., as indicated in the request), the system may then segment the field of view for the array of cameras into separate fields of view for each of the cameras within the array of cameras, such that the fields of view for adjacent cameras each capture overlapping image information.

To achieve a particular field of view for a camera, the camera may be caused to adjust its pan, tilt, and/or level of magnification. In adjusting a level of magnification, the system may determine an appropriate focal length for the desired field of view and may adjust optical characteristics of the camera to achieve that focal length. At least one method of determining an appropriate focal length for each camera based on received depth information (or distance) and a boundary for the field of view is described in more detail with respect to FIG. 4 below.

At 310, the control unit 202 may provide instructions to one or more actuators in order to cause one or more of the cameras in the array of cameras to be reconfigured based on its respective determined field of view. For example, a pan or tilt of the camera may be adjusted in order to shift a field of view for that camera. For example, a camera may be panned so that a field of view associated with the camera is shifted along a horizontal axis. In another example, a camera may be tilted so that a field of view associated with the camera is shifted along a vertical axis.

At 312, the control unit 202 may cause the camera devices to capture image information for a set of images, wherein each image in the set of images is taken by a separate camera of the camera array. In some embodiments, the image capture may be performed by each camera of the array of cameras in parallel (e.g., capturing images by each of the camera devices may be synchronized). In some embodiments, multiple sets of images may be captured.

At 314, the control unit 202 may determine whether the system still needs to capture additional images. For example, the system may determine whether images have been captured from each relevant object position. If the system determines that additional images are still required, then the system may rotate the object and/or reposition the cameras relative to the object and return to step 304. In some embodiments, the system may capture a number of images at any angle of rotation. The angle of rotation and/or number of rotations may be specified in the received request. For example, the operational characteristics provided by the user in the request may include an indication that the object should be rotated 12° between each set of images. In this example, the process described above may be repeated a total of 30 times (for a full 360° of images). If the system determines that no additional images are necessary (e.g., that all of the required sets of images have been obtained), then the system may end the imaging process 300. In some embodiments, the system may generate a 3D model from the captured image sets.

In accordance with at least some embodiments, the process 300 may be performed by a control unit 202 automatically (e.g., without human interaction). For example, a user may place an object on a staging platform 226 and provide various operational characteristics for the 3D image to be captured via interface device 208. The control unit 202 may then perform process 300 without requiring any further interaction from the user.

Figure 4:
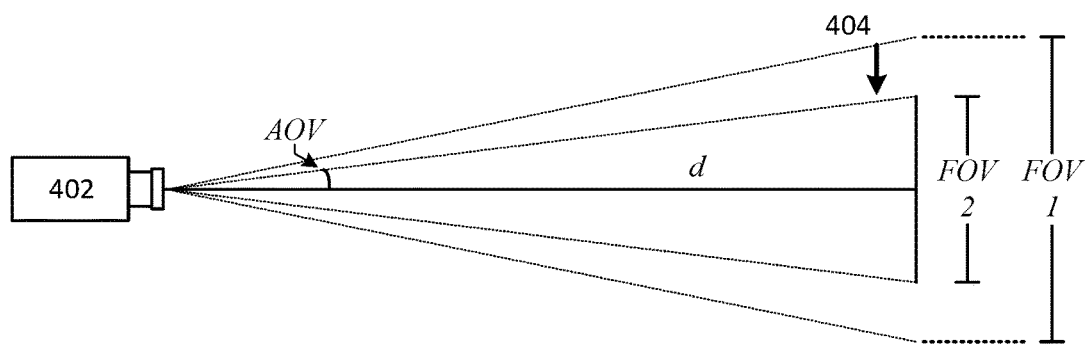
FIG. 4 depicts an illustration of a method for determining an appropriate focal length to be used by a camera device given a known distance and one or more boundaries for a field of view.

FIG. 4 depicts an illustration of a method for determining an appropriate focal length to be used by a camera device given a known distance and one or more boundaries for a field of view. In FIG. 4, a camera device may be positioned some distance d from an object. It should be noted that the distance d may correspond to distance information and may be determined based on information provided by one or more range cameras, as described elsewhere in the specification.

With respect to the camera device 402 depicted in FIG. 4, the described 3D imaging system may be configured to increase or decrease a field of view (FOV). The field of view for a camera device can be altered by adjusting a level of zoom for the camera device. For example, as depicted at 404, as a camera device is zoomed in, the field of view changes from FOV 1 to FOV 2, capturing an image of a smaller area at distance d than an image captured before being zoomed in. There are primarily two separate methods of performing a zoom function for a camera device: digital zoom and optical zoom.

Digital zoom is a method of decreasing the apparent angle of view of a digital photographic or video image. Digital zoom is accomplished by cropping a field of view to a centered area with the same aspect ratio as the original. This may also involve interpolating the result back up to the pixel dimensions of the original. Digital zoom is accomplished electronically, with no adjustment of the camera's optics, and no optical resolution is gained in the process.

Optical zoom, which may require the use of a zoom lens, is a method of decreasing the angle of view (AOV) of the camera device by moving one or more lenses of the camera device to achieve a particular focal length. Focal length, usually represented in millimeters (mm), is a calculation of an optical distance from the point where light rays converge to form a sharp image of an object in a digital sensor in the camera device. During an optical zoom process, one or more lenses within the camera device are repositioned, altering the focal length, in order to adjust the field of view.

In some embodiments, one or more camera devices 402 included in a 3D imaging array may receive information on a distance from the camera to an object. The camera device may also receive information on a field of view of the object to be captured by that camera device. In some embodiments, the camera device 402, or a processor in communication with the camera device 402, may perform a digital zoom operation by cropping an image collected by the camera device to include only the area representing the provided field of view. In some embodiments, one or more lenses within the camera device 402 may be moved in order to achieve a particular focal length. The appropriate focal length to be used may be calculated by first obtaining a required angle of view, which may be calculated using the equation:

$$AOV(^\circ) = \tan^{-1}\left(\frac{FOV}{2d}\right)$$

In this equation, AOV represents the angle of view, FOV represents the desired field of view (which is provided), and d represents the distance to the object (which is also provided). Once the required angle of view has been determined, the focal length can be approximated using the equation:

$$AOV(^\circ) = \tan^{-1}\left(\frac{h}{2f}\right)$$

In this equation, AOV represents the angle of view, h represents the height of a sensor device receiving the image within the camera device (which is known and fixed), and f represents the focal length. Once the focal length is found, the proper lens/lens placement may be determined. Using a zoom lens, lenses within the camera device may then be moved to achieve the calculated focal length.

FIG. 5A depicts a top-down view of a 3D imaging apparatus configured to capture image information for an object in accordance with embodiments of the disclosure. In FIG. 5A, an array, or matrix, of cameras is positioned to capture a set of images related to an object. The array of cameras may be structured to include cameras in rows and columns. For example, in FIG. 5A, row 502 may be representative of a row of four cameras that are each aimed at a portion of an object 504 placed on a staging platform 506. In some embodiments, a subset (e.g., less than all) of the cameras in row 502 may be used to capture the set of images.

Each of the cameras in row 502 may be associated with a field of vision 508. In some embodiments, image information captured by the camera may be assessed to identify the field of vision currently associated with that camera. In some embodiments, a field of vision may be identified for the camera based on its current tilt, pan, and level of magnification. Once a current field of vision is determined for a camera, the 3D imaging apparatus may be configured to identify a desired field of view for the camera and adjust the current tilt, pan, and level of magnification of the camera to achieve that desired field of view. For example, the 3D imaging apparatus may identify one or more object boundaries 510 and/or a horizontal overlap 512 to which the fields of view 508 should be subjected. The 3D imaging apparatus may then adjust the fields of view 508 in accordance with that object boundary 510 and/or a horizontal overlap 512. To do this, the 3D imaging apparatus may first identify a desired total field of view for the camera array that includes a field of view bounded by the one or more object boundaries 510. The 3D imaging device may then divide the total field of view horizontally into a number of segments corresponding to the number of cameras in row 502. These segments may then be expanded to reach the desired horizontal overlap 512. A tilt, pan, and/or level of magnification may then be adjusted for each of the cameras in the row of cameras 502 to achieve the desired field of view for each camera. It should be noted that each of the cameras may be adjusted to have different levels of tilt, pan, or magnification. For example, as described with respect to FIG. 4 above, the calculations for achieving a particular field of view may require distance information. In some cases, that distance information may vary across the surface of an object. In that situation, each camera, even within the same row 502, may be adjusted differently. This is described in greater detail with respect to FIG. 6 below.

FIG. 5B depicts a side view of a 3D imaging apparatus configured to capture image information for an object in accordance with embodiments of the disclosure. FIG. 5B offers a view which is alternative to FIG. 5A, in that a column 514 of cameras of the array of cameras is depicted. It should be noted that although FIG. 5A and FIG. 5B depicts a 4×2 array, an array of cameras may have any number of rows and/or columns. In some embodiments, the 3D imaging apparatus may use a subset of the cameras in the array of cameras to collect a set of images. For example, even though a camera array may be a 4×2 array, the 3D imaging apparatus may elect to use a 2×2 array of camera devices within the 4×2 array for imaging purposes.

Similar to FIG. 5A, FIG. 5B depicts that one or more object boundaries 516 may be used to confine a total field of view for an array of cameras with respect to the object 504. Additionally, the images obtained by the array of cameras may also have a vertical overlap 518. As described above, a desired total field of view for the array of cameras may be calculated such that it is constrained by the one or more object boundaries 516. The total field of view for the array of cameras may then be segmented into a number of segments correlated to the cameras in the column 514. Each of these segments may be sized to obtain a desired vertical overlap 518.

Figure 6:
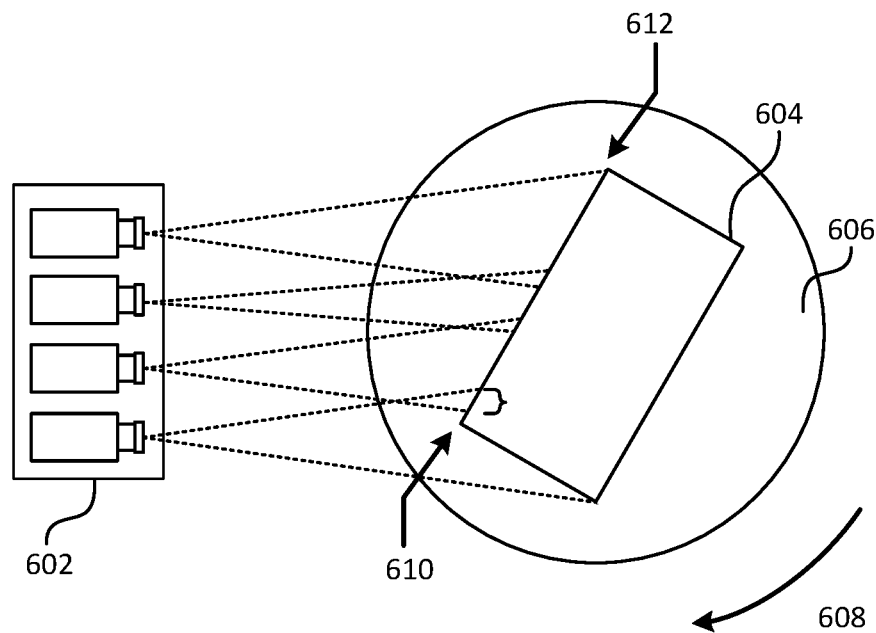
FIG. 6 depicts a top-down view of a 3D imaging apparatus configured to capture image information for an object with varying depths in accordance with embodiments of the disclosure.

FIG. 6 depicts a top-down view of a 3D imaging apparatus configured to capture image information for an object with varying depths in accordance with embodiments of the disclosure. In FIG. 6, an array of cameras 602 may be positioned to obtain image information for an object 504 placed on a staging platform 506. As depicted, subsequent to a repositioning event 608, depth information associated with the object may be updated. In some embodiments, the depth information for the object 504 may vary such that it indicates one or more relatively lower depth areas 610 and/or one or more relatively higher depth areas 612.

In a scenario in which depth information for an object is varied across the object, one or more fields of view for the cameras of the array of cameras may be varied. In some embodiments, a field of view for a particular camera may be determined based on an average depth of the object over an area of the object to be imaged by the camera. In some cases, the bounds for an object's total field of view may change as the object is repositioned. In these cases, the field of view for one or more cameras in the array of cameras may be updated based on the new bound information.

FIG. 7 depicts an illustrative example of an automated matrix framing procedure that may be implemented in accordance with at least some embodiments. In particular, FIG. 7A depicts an image that may be captured by a 3D imaging system prior to a matrix framing procedure. FIG. 7B depicts an image that may be captured by the 3D imaging system subsequent to a matrix framing procedure.

In FIG. 7, an object 702 is depicted (a couch) within an initial field of view for an array of cameras. As depicted, the initial field of view may include a number of smaller fields of view (e.g., 704), each of which may overlap to some extent and each of which is associated with a camera of an array of cameras. Each of the smaller fields of view 704 may be centered around a focus point 706 which represents an indication as to a location of the object at which the camera is aimed.

Once an outline of the object 702 is determined within the initial field of view, the 3D imaging system may identify areas which comprise whitespace 708. In some embodiments, the 3D imaging system may be configured to eliminate, or at least minimize, the whitespace 708 within the field of view. To do this, the 3D imaging system may adjust one or more boundaries of the field of view so that the boundaries match boundaries determined for the object 702.

In some embodiments, the 3D imaging system may be configured to align the field of view for the array of cameras to the boundaries of the object 702. The field of view for the array of cameras may then be segmented. As depicted by the arrow in FIG. 7B, the focus 706 associated with one or more of the cameras in an array of cameras may be adjusted by shifting that focus 706. To do this, a tilt or pan of the one or more cameras may be adjusted in order to change the aim of the camera. In some embodiments, the field of view may also be adjusted (e.g., narrowed or broadened) as the tilt or pan of the one or more cameras is adjusted. In some embodiments, 3D imaging system may identify a particular field of view to be assigned to each camera in the camera array based on a required overlap 710 or some other provided operational constraints. In some embodiments, the overlap 710 may be represented as a percentage or proportion of a field of view. In some embodiments, the overlap 710 may represent a number of pixels that will be shared by two adjacent fields of view.

Figure 8:
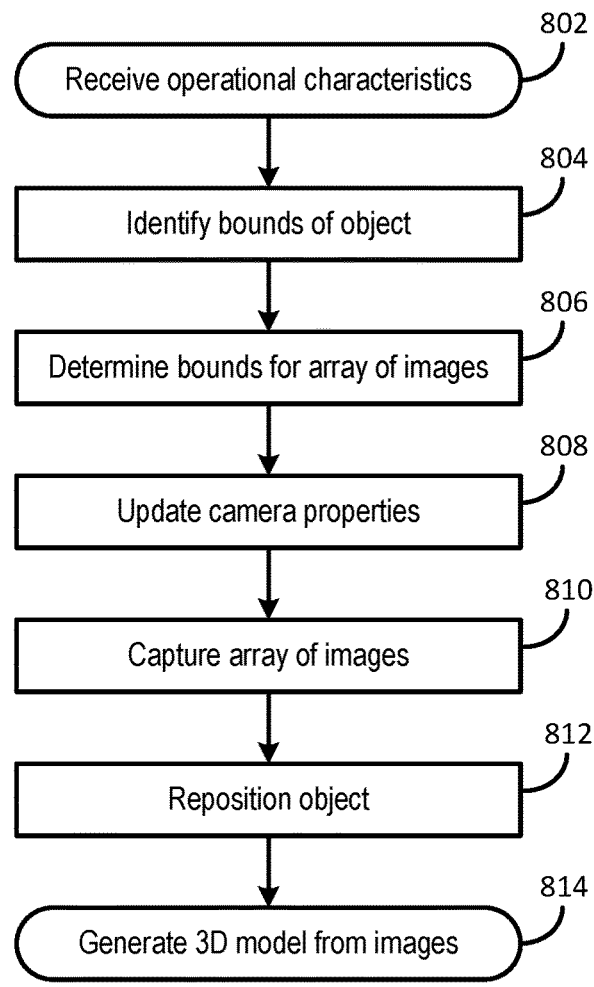
FIG. 8 depicts a flow diagram illustrating a process for automatically adjusting an array of cameras and capturing a set of images in accordance with embodiments of the disclosure.

FIG. 8 depicts a flow diagram illustrating a process for automatically adjusting an array of cameras and capturing a set of images in accordance with embodiments of the disclosure. In accordance with at least some embodiments, the process 800 may be implemented by a control unit 202 as described in FIG. 2.

In some embodiments, process 800 may begin at 802, when the system receives one or more operational constraints for the system. In some embodiments, the operational constraints may include an indication of an overlap to be applied to one or more images in an array of images. For example, the user may provide an indication of a number of pixels that should be shared by adjacent images (either horizontally or vertically adjacent) within an array of images. In some embodiments, the user may also provide a number of images to be used in generating a 3D model. The control unit may identify an angle for each rotation of a staging platform based on the number of images. For example, the user may indicate that six sets of images should be obtained. In this example, the control unit may determine that the object should be repositioned in sixty-degree increments.

At 804, the control unit may identify a boundary or bounds of the object for which a set of images is to be captured. In some embodiments, the bounds may be determined based on the depth of information obtained for the object. For example, a depth map or range image may be used to locate one or more boundaries of the object. In some embodiments, the control unit may utilize one or more machine vision techniques to identify boundaries for the object.

At 806, the control unit may determine, based on the identified bounds of the object, boundaries for a number of images to be taken in an array of images based on the operational constraints provided. For example, the control unit may identify a number of boundaries for fields of view associated with various cameras of an array of cameras by first identifying boundaries of the object and then segmenting the space between those boundaries into portions. In some embodiments the segments may overlap by some amount indicated in the operational constraints. For example, one or more adjacent segments may share a number of pixels with its neighbors. Once the boundaries for these segments have been identified, the control unit may calculate optical properties to be applied to each of the cameras in the array of cameras to achieve a field of view associated with each of the segments.

At 808, the control unit may update one or more properties of the cameras in the array of cameras to achieve the determined fields of view. For example, the control unit may cause one or more cameras to be repositioned. In addition, a pan or tilt of one or more cameras may be altered to shift a focus of that camera. In some embodiments, a level of magnification or zoom may be updated in order to change the field of view to the appropriate field of view for that camera.

At 810, the control unit may cause the array of cameras to capture image information associated with the object. In some embodiments, the image information may include an array of images corresponding to the array of cameras by which the image information was captured. For example, in the captured image information, a number of images may be taken that each portray a different portion of the object 104 according to the determined field of view.

At 812, the control unit may reposition the object. In some embodiments, the control unit may cause the object to be repositioned a number of times in order to capture a subsequent set of images. For example, the operational constraints received by the control unit may identify a number of different object orientations from which image information is to be captured. In this example, the control unit may, upon capturing the initial array of images, cause the object to be rotated, the fields of view associated with an array of cameras readjusted (e.g., using steps 804-810 described above), capture an additional array of images, and repeat this process until a full set of images has been obtained.

At 814, the control unit may generate a 3D model from the obtained image information. In some embodiments, the images in the array of images may be mapped onto a shell or other object model. In some embodiments, the images in the array of images may be aligned based on the overlapping pixels from each adjacent image in the array of images. The process 800 may be completed upon generation of the 3D model.

Embodiments of the disclosure provide for a number of technical advantages over conventional systems. For example, embodiments of the 3D imaging system described may be configured to use depth information to minimize whitespace, therefore reducing wasted data while optimizing the quality of the images that are captured. Additionally, the system of the disclosure may be configured to automatically capture a series of sets of images upon receiving operational constraints from a user. To do this, the system utilizes unconventional techniques in which boundaries and depths are determined for an object in order to identify relevant matrix frame information. This results in images with significantly higher quality and with less wasted data than images obtained using conventional systems. Furthermore, by automatically framing each matrix of images in the manner described, the system can capture sets of images at rates much higher than those of conventional 3D imaging systems.

Figure 9:
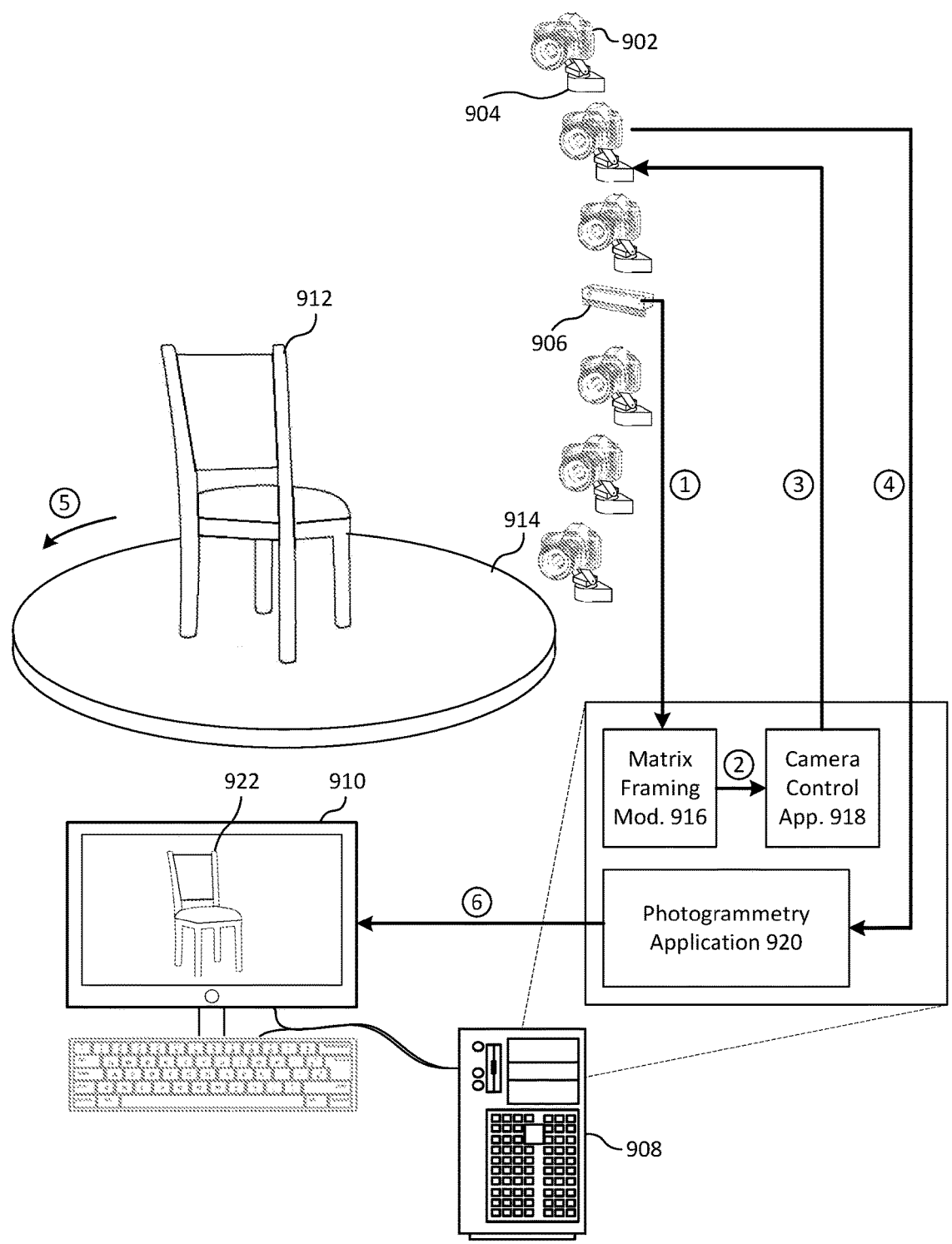
FIG. 9 depicts one potential implementation of the system described in accordance with the disclosure.

FIG. 9 depicts one potential implementation of the system described in accordance with the disclosure. The implementation depicted in FIG. 9 is provided for illustrative purposes and is not intended to be limiting.

In FIG. 9 is depicted an array of cameras 902, each of which is mounted on a robotic pan/tilt platform 904. In this particular implementation, suitable cameras 902 may include a number of Canon EOS 5DS R cameras which each have a 50.6 Megapixel sensor and the low-pass filter (LPF) effect cancelled in order to provide greater fine-edge sharpness and detail. Additionally, suitable robotic pan/tilt platforms 904 may include any device upon which a camera 902 may be mounted which is capable of achieving a specified position of the camera. The robotic pan/tilt platforms 904 may have a number of servomotors or other actuators capable of positioning each camera 902 to a particular pan/tilt (e.g., by rotating the camera 902 along a horizontal or vertical axis) and may be an example of a sensor device adjustment mechanism 232 as depicted in FIG. 2.

Also depicted is a depth sensor device 906. In this particular implementation, one such suitable depth sensor device 906 may be a Microsoft Kinect 2.0 depth sensor capable of sensing depths up to about 4.5 meters. The Microsoft Kinect 2.0 depth sensor has a horizontal field of view of 70° as well as a vertical field of view of 50°, meaning that a single depth sensor 906 is likely sufficient for detecting depth information associated with most items.

Each of the cameras 902, robotic pan/tilt platforms 904, and depth sensor device 906 are depicted as being coupled with a control unit 908. Control unit 908 may be any suitable computing device capable of performing the functions described herein and may be an example control unit 202 as depicted in FIG. 2. As described above, the control unit 908 is in communication with an interface device 910, which may be an example interface device 208 as depicted in FIG. 2.

Additionally depicted is an object 912 (a chair in this example) staged on an object positioning platform 914. The object positioning platform 914 may be a turntable capable of rotating the object around a vertical axis and may be an example object positioning platform 226 as depicted in FIG. 2. The object positioning platform 914 may also be in communication with the control unit 908, which may provide instructions to the object positioning platform 914 to cause it to reposition the chair 912.

In the depicted implementation, the control unit 908 may include a number of applications configured to interact (e.g., via application programming interfaces (APIs)) to generate a 3D model of the chair 912. In particular, the control unit 908 may include at least a matrix framing module 916, a camera control application 918, and a photogrammetry application 920. The matrix framing module 916 may be an example of matrix framing module 218 of FIG. 2, which is described in greater detail elsewhere.

The camera control application 918 may be any application capable of remotely changing camera settings in accordance with a determined field of view. One such suitable camera control application 918 may be the Smart Shooter photography software application provided by the Kuvacode software company. Smart Shooter is capable of being driven by a script, which enables capturing a series of different photos without manual operation of the camera 902. In some embodiments, the matrix framing module 916 may generate a script, which may then be executed by the Smart Shooter software application. For the purposes of this disclosure, a script may be any set of instructions (e.g., in a text file) that contains commands for an application to carry out. For the Smart Shooter® software application, transaction control language (TCL) is used as the scripting language.

The photogrammetry application 920 may be any application capable of generating a 3D model representation 922 from image information captured in accordance with embodiments of the disclosure. Some suitable photogrammetry applications 920 may include Agisoft Photoscan photogrammetry software application and CapturingReality photogrammetry software application, both of which are capable of performing photogrammetric processing of digital images and generating 3D spatial data (e.g. 3D models).

The exemplary system depicted in FIG. 9 is capable of capturing images of a chair 912 and generating a 3D model representation 922 of that object. At step 1 of a process in which a 3D model representation 922 is generated from a chair 912, the Microsoft Kinect 2.0 depth sensor may be accessed to obtain a depth map associated with the chair 912. The depth information may be used by the matrix framing module 916 to identify an appropriate field of view for each of the Canon EOS 5DS R cameras 902 in the array of cameras. Once an appropriate field of view is determined for each of the cameras 902, the matrix framing module 916 may provide instructions to the Smart Shooter software application (i.e., the camera control application 918) at step 2. In some embodiments, the matrix framing module 916 may interact with the Smart Shooter software application via an API. In some embodiments, the matrix framing module 916 may generate a script to be executed by the Smart Shooter® software application.

At step 3, the Smart Shooter software application may provide instructions to each of the cameras 902 and/or the robotic pan/tilt platforms 904 to achieve an appropriate field of view. Once each of the cameras 902 has been properly positioned, the Smart Shooter software application may provide instructions to the cameras 902 to capture image information associated with each of the field of views. Image information captured by the cameras 902 (e.g., an image matrix) may be relayed to the Agisoft Photoscan software application (i.e., the photogrammetry application 920) executed on the control unit 908 at step 4. Once the image information has been received by the control unit 908, the turntable (i.e., the object positioning platform 914) may be rotated to reposition the chair 912 at step 5. Steps 1-5 may then be repeated until a full set of images has been obtained by the Agisoft Photoscan software application, at which point it may generate a 3D model representation at step 6.

It should be noted that the system described herein is capable of capturing a complete set of images (e.g., all images needed to generate a full 3D model) within 90 seconds, regardless of the number of cameras used. For example, the exemplary system depicted in FIG. 9, having six cameras arranged in an arced column, may be configured to capture images of an item 912 positioned on the turntable. Assuming in this example that the turntable is provided instructions to reposition the item 912 in 15° increments, the system is capable of capturing 144 images (6 cameras×24 positions) (each image captured with a Canon EOS 5DS R camera having a resolution up to 50.6 megapixels) within 90 seconds and generating an accurate 3D model using those images within 3 hours (using the corresponding photogrammetry application 920). Accordingly, the implementation of the system described, having the specific components depicted, is capable of capturing a large number of high-resolution images within a short period of time using the techniques described herein. The number of images that may be captured by an array of cameras in a single scan, as well as the level of detail in those images, depends upon the number of cameras used in the described system. As the number of cameras increases, the resolution of the 3D model can be increased and/or the time it takes to capture all of the images necessary for a 3D model can be decreased (e.g., by reducing the number of scans needed). For example, if additional cameras are added to the array of cameras that are arranged to capture more surface area of the object around a vertical axis, then fewer rotations/scans would be needed to obtain a full set of images. In some embodiments, although the time in which images may be captured may or may not change with the number of cameras used, the time that the photogrammetry application 920 takes to generate 3D models from those images will increase non-linearly with the number of cameras. Likewise, the resolution may increase or decrease with the number of cameras used. For example, adding additional cameras to the array of cameras may decrease a field of view assigned to each of the cameras and cause each camera to zoom in. The increased number of cameras would also increase the number of images captured in the matrix of images. Because the resolution of each image remains the same, the increased number of images in the matrix of images results in a higher overall resolution for the matrix of images, with each camera capturing more detail in its respective image. The system in this example therefore is able to generate accurate and high-definition 3D models based on 7.286 Gigapixels of images within 3 hours. This corresponds to a high-definition 3D model generation rate of more than 2.42 Gigapixels per hour. Additionally, each image matrix captured is automatically framed such that white space is eliminated and an appropriate level of overlap is achieved. This represents a significant improvement over conventional systems.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of generating a 3D model by multiple camera devices, comprising:
   determining at least a level of image overlap for an object to be represented by a 3D model;
   identifying boundary information indicative of an outline of the object;
   determining, based on the boundary information, a number of individual image boundaries for each image in a matrix of images to be captured by the multiple camera devices such that the matrix of images encompasses the outline and the images in the matrix of images overlap to an extent corresponding to the level of image overlap;
   causing an imaging property of individual camera devices in the multiple camera devices to be adjusted to enable the multiple camera devices to capture respective images having the determined individual image boundaries; and
   causing the multiple camera devices to capture the matrix of images.

2. The method of claim 1, wherein the boundary information is identified using machine vision.

3. The method of claim 1, wherein the imaging property of the individual camera devices comprises at least one of a pan, tilt, or level of magnification.

4. The method of claim 1, wherein the level of image overlap comprises a distance between at least two adjacent image boundaries for the number of individual image boundaries for the matrix of images.

5. The method of claim 1, wherein the level of image overlap comprises at least one of a number of pixels shared by adjacent images in the matrix of images or a percentage of image area shared by adjacent images in the matrix of images.

6. The method of claim 1, further comprising repositioning the object, wherein the method is repeated to obtain a complete set of matrices of images as determined based on a determined number of object rotations, wherein the complete set of matrices of images is captured within 90 second.

7. A 3D imaging system comprising:
   an input sensor;
   one or more camera devices;
   a processor; and
   a memory including instructions that, when executed with the processor, cause the system to, at least:
      determine at least a level of image overlap for an item to be represented by a 3D model;
      obtain input from the input sensor indicating depth information associated with the item;
      determine at least one boundary indicative of an outline of the item;
      adjust the one or more camera devices such that a matrix of images captured by the one or more camera devices encompasses the outline and the images in the matrix of images overlap to an extent corresponding to the level of image overlap; and
      capture, using the one or more camera devices, image information using the adjustment.

8. The 3D imaging system of claim 7, wherein the input sensor comprises at least a depth sensor.

9. The 3D imaging system of claim 8, wherein the depth sensor comprises an imaging device that uses structured light to determine depth information.

10. The 3D imaging system of claim 9, wherein the boundary for the item is determined based on a variance in the depth information.

11. The 3D imaging system of claim 10, wherein the variance in depth information is determined to comprise a boundary when the variance in depth information exceeds a threshold variance level.

12. The 3D imaging system of claim 7, wherein adjustment of the one or more camera devices comprises adjusting a level of zoom.

13. A 3D imaging apparatus comprising:
an array of cameras configured to capture a matrix of images of an object; and
a control unit communicatively coupled to the array of cameras, the control unit configured to:
determine, via an interface, at least a level of image overlap for an object to be represented by a 3D model;
identify a boundary indicative of an outline of the object;
determine a number of image boundaries for images in the matrix of images from the identified boundary of the object such that the images in the matrix of images overlap to an extent corresponding to the level of image overlap; and
provide instructions to the array of cameras to cause it to capture the matrix of images with the image boundaries determined by the control unit.

14. The 3D imaging apparatus of claim 13, further comprising a staging device, wherein the control unit is further configured to cause the staging device to rotate the object.

15. The 3D imaging apparatus of claim 14, wherein the control unit is further configured to:
subsequent to causing the staging device to rotate the object, identify a second boundary of the object;
determine a number of second image boundaries from the identified second boundary of the object such that the images in the matrix of images overlap to an extent corresponding to the level of image overlap; and
provide instructions to the array of cameras to cause it to capture a second matrix of images with the second image boundaries determined by the control unit.

16. The 3D imaging apparatus of claim 13, wherein the 3D imaging apparatus is configured to cause the staging device to rotate the object by a determined number of degrees.

17. The 3D imaging apparatus of claim 13, wherein the number of degrees is determined based on a number of rotations indicated via the interface.

18. The 3D imaging apparatus of claim 13, wherein the number of image boundaries are identified from the boundary of the object by segmenting an area within the boundary.

19. The 3D imaging apparatus of claim 13, wherein the area within the boundary is segmented according to a number of cameras in the array of cameras.

20. The method of claim 1, wherein the level of image overlap comprises at least some area shared by adjacent images in the matrix of images.

* * * * *